US008164859B2

(12) United States Patent
Imamura et al.

(10) Patent No.: US 8,164,859 B2
(45) Date of Patent: Apr. 24, 2012

(54) HEAD SLIDER PRODUCING REDUCED LUBRICANT ADSORPTION AND MAGNETIC STORAGE APPARATUS

(75) Inventors: Takahiro Imamura, Kawasaki (JP); Hiroshi Chiba, Kawasaki (JP); Hiroyuki Kubotera, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 319 days.

(21) Appl. No.: 12/484,077

(22) Filed: Jun. 12, 2009

(65) Prior Publication Data

US 2010/0002339 A1   Jan. 7, 2010

(30) Foreign Application Priority Data

Jul. 4, 2008   (JP) .................................. 2008-176088

(51) Int. Cl.
G11B 5/60   (2006.01)
(52) U.S. Cl. ...................................................... 360/235.1
(58) Field of Classification Search ............... 360/235.1, 360/235.2, 235.3
See application file for complete search history.

(56) References Cited

U.S. PATENT DOCUMENTS

| 4,327,387 | A | * | 4/1982 | Plotto ......................... 360/235.2 |
| 4,863,809 | A | * | 9/1989 | Brar et al. .................... 428/623 |
| 5,768,056 | A | * | 6/1998 | Boutaghou et al. ......... 360/235.1 |
| 6,249,403 | B1 | * | 6/2001 | Tokisue et al. .............. 360/235.2 |
| 6,421,202 | B1 | * | 7/2002 | Tanaka et al. ................ 360/122 |
| 6,737,281 | B1 | * | 5/2004 | Dang et al. ........................ 438/3 |
| 6,778,358 | B1 | * | 8/2004 | Jiang et al. ................. 360/125.5 |
| 7,317,594 | B2 | * | 1/2008 | Nakamura et al. ............ 360/135 |
| 8,018,683 | B2 | * | 9/2011 | Nakamura et al. ......... 360/235.1 |
| 2005/0219754 | A1 | * | 10/2005 | Buchan et al. ............. 360/235.2 |
| 2006/0221502 | A1 | * | 10/2006 | Watanabe et al. .......... 360/235.8 |
| 2008/0124580 | A1 | * | 5/2008 | Musashi et al. ............... 428/810 |
| 2008/0158716 | A1 | | 7/2008 | Kubotera et al. |
| 2009/0059432 | A1 | * | 3/2009 | Kubotera et al. .......... 360/236.6 |
| 2010/0002339 | A1 | * | 1/2010 | Imamura et al. ........... 360/234.3 |
| 2010/0103560 | A1 | * | 4/2010 | Imamura et al. ........... 360/234.3 |

FOREIGN PATENT DOCUMENTS

| JP | 63064684 | A | * | 3/1988 |
| JP | 63251981 | A | * | 10/1988 |
| JP | 05325161 | A | * | 12/1993 |
| JP | 09-219077 | | | 8/1997 |
| JP | A 10-11731 | | | 1/1998 |
| JP | 11-203651 | | | 7/1999 |
| JP | 2001-357510 | | | 12/2001 |

(Continued)

OTHER PUBLICATIONS

Notice of Rejection dated Jan. 4, 2012 for Japanese Application Serial No. 2008-176088 (with English translation).

*Primary Examiner* — Brian Miller
(74) *Attorney, Agent, or Firm* — Greer, Burns & Crain, Ltd.

(57) ABSTRACT

A head slider includes a medium opposing surface configured to oppose a recording surface of a magnetic recording medium, a head element provided on the medium opposing surface, and an outlet end surface provided on a downstream side of the head element in a direction in which the magnetic recording medium moves relative to the head element, and extending substantially in a perpendicular direction from the medium opposing surface. The outlet end surface has a surface free energy greater than a surface free energy of the medium opposing surface.

12 Claims, 7 Drawing Sheets

FOREIGN PATENT DOCUMENTS

| | | |
|---|---|---|
| JP | A 2003-109340 | 4/2003 |
| JP | 2004-265541 | 9/2004 |
| JP | 2007-026587 | 2/2007 |
| JP | 2008065903 A * | 3/2008 |
| JP | 2008-181627 | 8/2008 |
| WO | WO2006/075362 | 7/2006 |

* cited by examiner

SFE LOW→HIGH

FIG.5

SFE LOW→HIGH

HEAD SLIDER PRODUCING REDUCED LUBRICANT ADSORPTION AND MAGNETIC STORAGE APPARATUS

CROSS-REFERENCE TO RELATED APPLICATIONS

This application is based upon and claims the benefit of priority of the prior Japanese Patent Application No. 2008-176088, filed on Jul. 4, 2008, the entire contents of which are incorporated herein by reference.

FIELD

The present invention generally relates to head sliders and magnetic storage apparatuses, and more particularly to a head slider that may be used in a state where a flying height thereof from a magnetic recording medium is extremely small, and to a magnetic storage apparatus having such a head slider. The present invention also relates to a method of fabricating such a head slider.

BACKGROUND

Recently, in order to increase the storage capacity of the magnetic storage apparatus which is typified by a magnetic disk drive, various measures have been proposed to improve the recording density of the magnetic recording medium which is typified by a magnetic disk. For example, the flying height (or distance) of the head slider, mounted with a head element, from the magnetic recording medium has been reduced to several nm. As the flying height of the head slider decreases to such a small amount, a lubricant forming a lubricant layer that is provided on the surface of the magnetic recording medium is more easily adsorbed on the head slider surface. For example, when the head slider vibrates and accidentally makes contact with the surface of the magnetic recording medium or, the lubricant evaporates from the surface of the magnetic recording medium, the lubricant is adsorbed on the surface (hereinafter referred to as a medium opposing surface) of the head slider which opposes (or confronts) the surface of the magnetic recording medium. When the lubricant is adsorbed on the medium opposing surface of the head slider, the adsorbed lubricant may form a lump and fall on the magnetic recording medium. If the lump of the adsorbed lubricant falls off the head slider onto the magnetic recording medium, the surface of the magnetic recording medium will be contaminated, and the lump of the adsorbed lubricant may interfere with the stable floating of the head slider or damage the head element.

In the case of the magnetic disk drive, an air flow is generated between the head slider and the magnetic disk by the rotating magnetic disk. Hence, it is conceivable to employ a structure (hereinafter referred to as a lubricant contamination preventing structure) which uses this air flow to make it more difficult for the lubricant to be adsorbed on and form the lump of the adsorbed lubricant the medium opposing surface of the head slider. However, the air flow flows from an upstream side towards a downstream side of the head slider. For this reason, even in the case of the head slider having the lubricant contamination preventing structure, the lubricant is adsorbed on an end surface (hereinafter referred to as an outlet end surface) which extends in a perpendicular direction from the medium opposing surface at the downstream side of the head slider. In other words, even if the lubricant adsorbed on the medium opposing surface of the head slider is continuously ejected outside the medium opposing surface by the air flow before the adsorbed lubricant forms the lump, a portion of the lubricant ejected from the medium opposing surface transpires to the air, and a portion of the ejected lubricant is adsorbed on the outlet end surface by a wraparound behavior.

When the lubricant is adsorbed on the outlet end surface of the head slider, the adsorbed lubricant may form a lump and fall onto the magnetic recording medium. In this case, the surface of the magnetic recording medium will be contaminated by the lump of the lubricant, and the lump may interfere with the stable floating of the head slider. In addition, when a balance of the shear stress or pressure between the head slider and the magnetic disk changes during a head seek or the like, the lubricant adsorbed on the outlet end surface of the head slider may flow in reverse and each the medium opposing surface of the head slider.

Medium opposing surfaces having various shapes have been proposed, as may be seen from Japanese Laid-Open Patent Publications No. 10-11731 and No. 2003-109340, for example.

Therefore, according to the conventional magnetic storage apparatus, the lubricant forming the lubricant layer that is provided on the surface of the magnetic recording medium is easily adsorbed on the outlet end surface of the head slider.

SUMMARY

Accordingly, it is an object in one aspect of the invention to provide a head slider, a magnetic storage apparatus, and a method of fabricating the head slider, that can suppress a lubricant forming a lubricant layer that is provided on the surface of a magnetic recording medium from being easily adsorbed on an outlet end surface of the head slider.

One aspect of the present invention is to provide a head slider comprising a medium opposing surface configured to oppose a recording surface of a magnetic recording medium; a head element provided on the medium opposing surface; and an outlet end surface provided on a downstream side of the head element in a direction in which the magnetic recording medium moves relative to the head element, and extending substantially in a perpendicular direction from the medium opposing surface, wherein the outlet end surface has a surface free energy greater than a surface free energy of the medium opposing surface.

According to one aspect of the present invention, there is provided a magnetic storage apparatus comprising a magnetic recording medium and the head slider described above.

According to one aspect of the present invention, there is provided a method of fabricating the head slider.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

According to one aspect of the present invention, a head slider has an outlet end surface having a surface free energy greater than that of a medium opposing surface. Hence, when the head slider vibrates and accidentally makes contact with a surface of a magnetic recording medium or, a lubricant evaporates from the surface of the magnetic recording medium, the lubricant reaching the outlet end surface can be made to spread widely and thinly, in order to promote transpiration of the lubricant from the outlet end surface. As a result, the lubricant is suppressed from being adsorbed on and forming a lump on the outlet end surface of the head slider.

In addition, by varying the surface free energy of the outlet end surface of the head slider from a side closer to the medium opposing surface towards a side farther away from the medium opposing surface, the lubricant is suppressed from flowing in reverse from the outlet end surface towards the medium opposing surface.

According to one aspect of the present invention, it is possible to positively suppress the lubricant forming a lubricant layer on the surface of the magnetic recording medium from being adsorbed on and forming the lump on the outlet end surface. According to one aspect of the present invention, it is possible to positively suppress the lubricant from flowing in reverse from the outlet end surface onto a floating surface of the head slider.

[First Embodiment]

Figure 1:
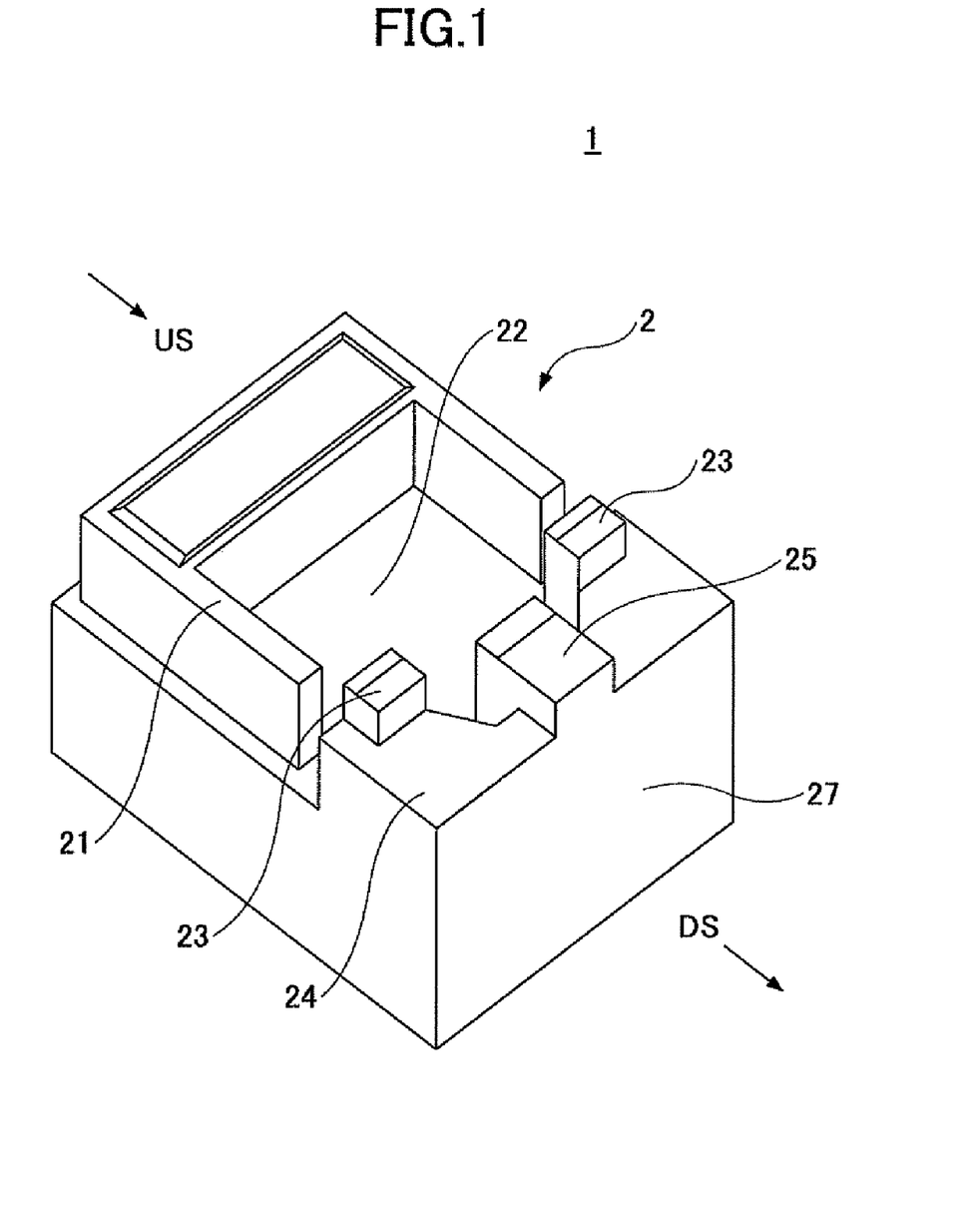
FIG. 1 is a perspective view of a head slider in a first embodiment of the present invention.
Figure 2:
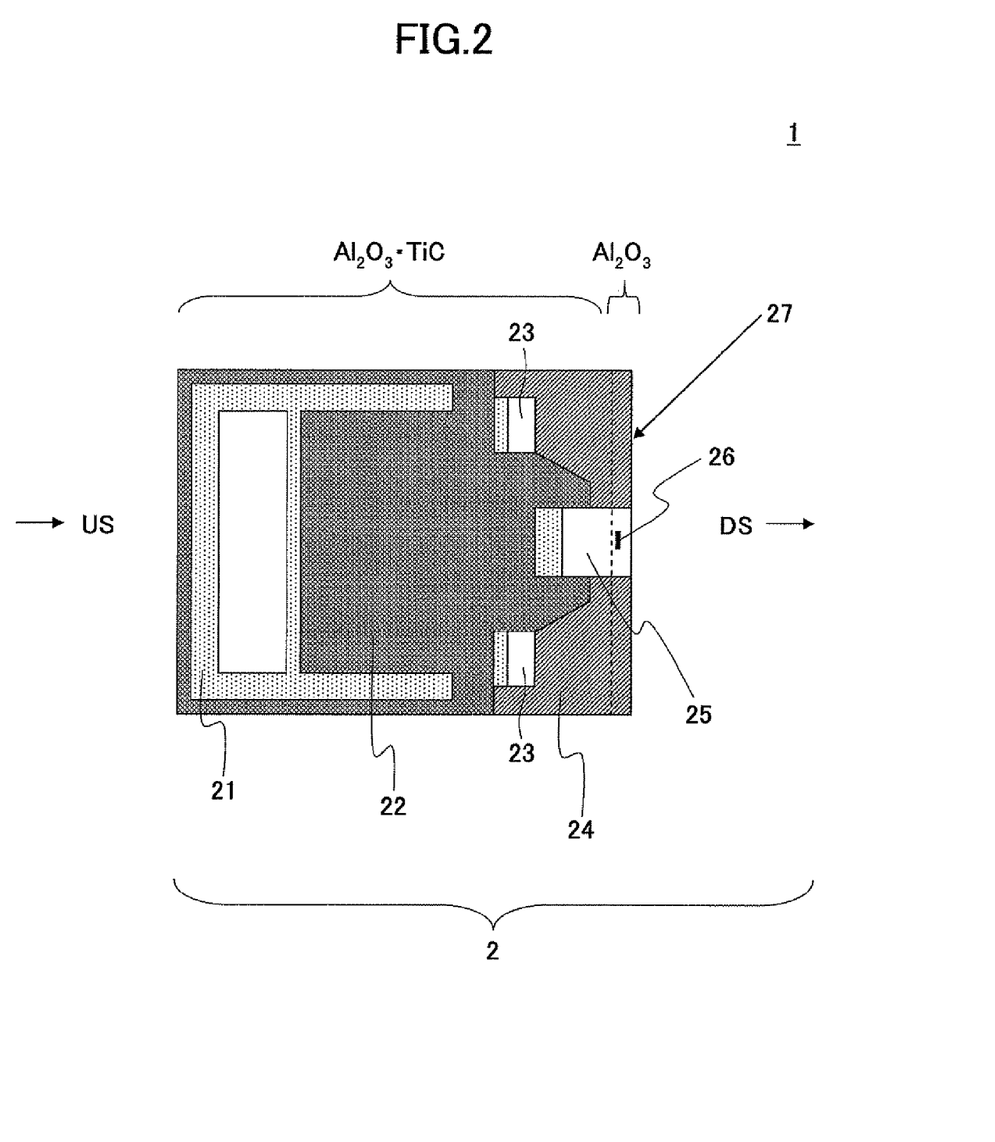
FIG. 2 is a plan view of the head slider illustrated in FIG. 1.

FIG. 1 is a perspective view of a head slider in a first embodiment of the present invention, and FIG. 2 is a plan view of the head slider illustrated in FIG. 1. FIG. 1 illustrates a head slider 1 viewed from a medium opposing surface 2 of the head slider 1. FIG. 2 also illustrates the head slider 1 viewed from the medium opposing surface 2. The medium opposing surface 2 refers to a surface which opposes (or confronts) a surface of a magnetic recording medium (not illustrated) provided with a lubricant layer. Of course, the magnetic recording medium refers to a medium, such as a magnetic disk, on which information is to be recorded and/or from which information is to be reproduced by the head slider 1.

As illustrated in FIGS. 1 and 2, the head slider 1 includes a shallow groove surface 21, a deep groove surface 22, a side pad surface 23, a Couette flow promoting surface 24, a center pad surface (or floating surface) 25, a head element 26, and an outlet end surface 27. The floating surface 25 may be regarded as an uppermost (or highest) surface, and is used as a reference height (or level). The shallow groove surface 21 is provided at a depth of several nm from the floating surface 25, the deep groove surface 22 is provided at a depth of approximately 1.5 μm from the floating surface 25, and the Couette flow promoting surface 24 is provided at a depth of 0.5 μm to 1.0 μm from the floating surface 25. In other words, the Couette flow promoting surface 24 is provided at an intermediate depth between the shallow groove surface 21 and the deep groove surface 22. The side pad surface 23 has the same height as the floating surface 25. In this example, the head slider 1 has a structure which does not generate a stagnation point of the shear stress vector on the Couette flow promoting surface 24. In FIG. 1, the depth (or height) of each of the parts of the head slider 1 with respect to the floating surface 25 is illustrated in an exaggerated manner in order to facilitate visual identification.

The medium opposing surface 2 is formed by AlTiC ($Al_2O_3 \cdot TiC$) having a surface free energy of 40 mN/m, for example. The outlet end surface 27 is usually formed by alumina ($Al_2O_3$) having a surface free energy of 30 mN/m to 40 mN/m, for example.

When the head slider 1 is mounted on a magnetic disk drive (not illustrated) and the magnetic disk rotates, an air flow is generated between the head slider 1 and the magnetic disk by the rotating magnetic disk. In this example, the head slider 1 has a structure (lubricant contamination preventing structure) which uses this air flow to make it more difficult for the lubricant to become adsorbed on and form a lump of the adsorbed lubricant the medium opposing surface 2 of the head slider 1. However, the air flow flows from an upstream side US towards a downstream side DS of the head slider 1. For this reason, even in the case of the head slider 1 having the lubricant contamination preventing structure, the lubricant may be adsorbed on the outlet end surface 27 which extends in a perpendicular direction from the medium opposing surface 2 at the downstream side DS of the head slider 1. The outlet end surface 27 may extend substantially in the perpendicular direction from the medium opposing surface 2, that is, extend approximately in the perpendicular direction from the medium opposing surface 2.

The air flow in FIG. 2 flows from the left side towards the right side, and the outlet end surface 27 is provided more on the downstream side SD of the air flow than the head element 26. In other words, the outlet end surface 27 is provided on the downstream side of the head element 26 in a moving direction of the magnetic recording medium which moves relative to the head element 26, and the outlet end surface 27 extends approximately in the perpendicular direction from the medium opposing surface 2.

In general, the outlet end surface of the head slider is formed by alumina ($Al_2O_3$), and has a surface free energy in a range of 30 mN/m to 40 mN/m. On the other hand, the surface free energy of the lubricant that is generally used in magnetic disks is approximately 20 mN/m. For this reason, the wetting characteristic of the lubricant adsorbed on the alumina outlet end surface does not cause the lubricant to strongly repel, but displays an intermediate wetting characteristic which thinly spreads. The present inventors have found that one of the causes of the lubricant becoming adsorbed on and forming the lump on the outlet end surface of the head slider depends on the relationship between the surface free energy of the outlet end surface and the surface free energy of the lubricant.

Figure 3:
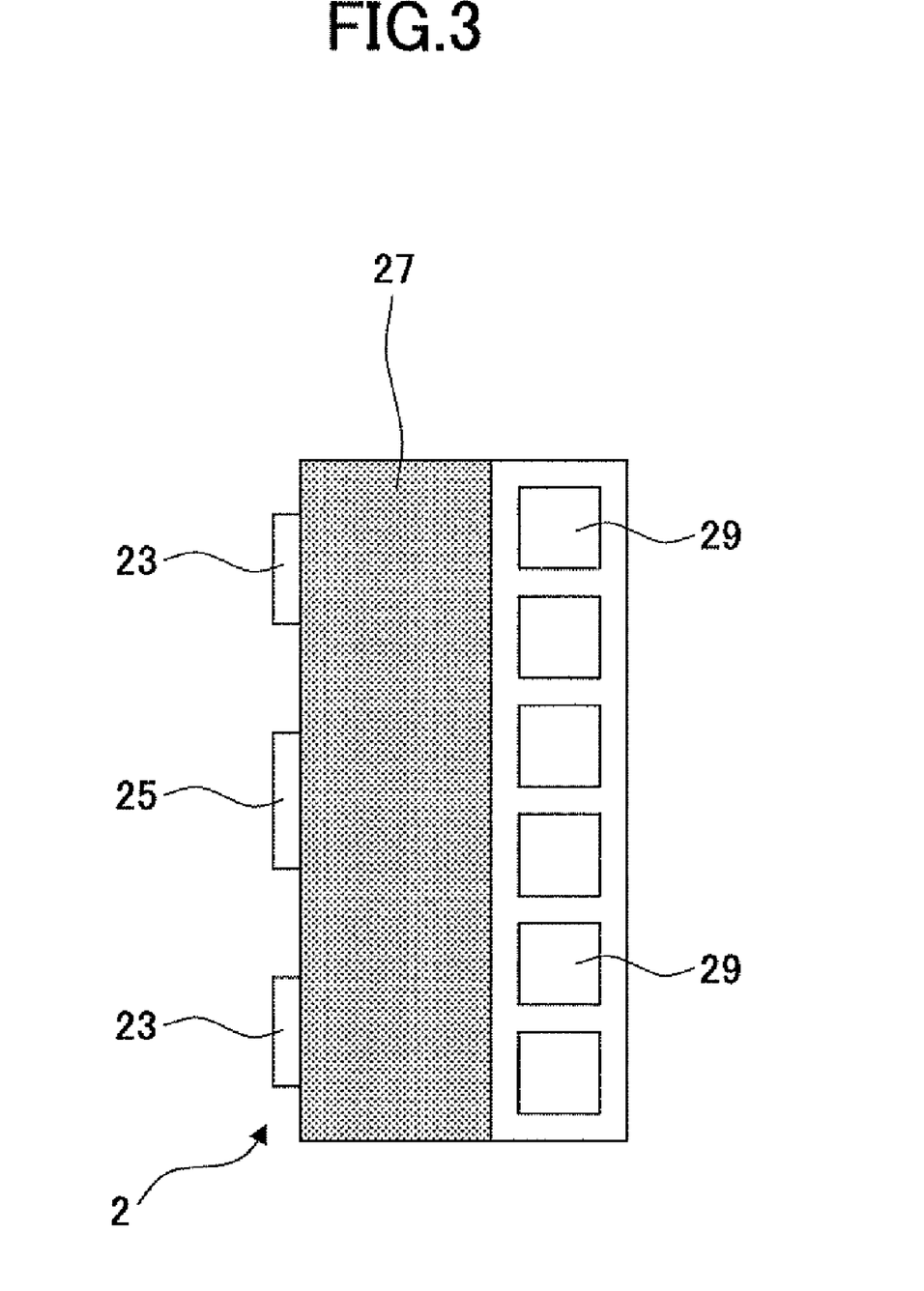
FIG. 3 is a side view of an outlet end surface of the head slider illustrated in FIG. 1.

Hence, in this embodiment, the outlet end surface 27 is formed by a metal layer as illustrated in FIG. 3 in order to increase the surface free energy of the outlet end surface 27. FIG. 3 is a side view of the outlet end surface 27 of the head slider 1 illustrated in FIG. 1. In FIG. 3, a plurality of terminals 29 include terminals connected to the head element 26. In this example, the plurality of terminals 28 include terminals connected to a heater (not illustrated) which is provided in a vicinity of the head element 26 and controls the flying height. The metal layer forming the outlet end surface 27 may be made of W (6814 mN/m), Pt (3747 mN/m), Ni (3799 mN/m), Co (3580 mN/m), Au (2516 mN/m) or the like. The surface free energy values in brackets for each of these metals forming the metal layer are taken from "Kagaku Binran (Handbook of Chemistry)", Second Edition, The Chemical Society of Japan, and indicate the values with respect to the solid metals at 20° C. or 5.5° C. The metal layer forming the outlet end surface 27 may be formed or adsorbed by a known layer forming method such as sputtering.

The lubricant forming the lubricant layer of the magnetic disk is not limited to a particular lubricant. In general, the lubricant used for the magnetic disk has a surface free energy of approximately 20 mN/m. On the other hand, the surface free energy of the metal layer forming the outlet end surface 27 is 200 times or greater than the surface free energy of the lubricant, and is high compared to the lubricant. For this reason, the lubricant, and particularly the lubricant which wraps around from the medium opposing surface 2 to reach the outlet end surface 27, covers the metal layer which has the high surface free energy and forms the outlet end surface 27. This lubricant covering the outlet end surface 27 thus acts to reduce the surface free energy of the system as a whole, and spreads widely and thinly on the metal layer, so that the lubricant will not be easily adsorbed on and form the lump on the metal surface. In addition, the lubricant will not easily flow in reverse towards the medium opposing surface 2. As a result, the transpiration of the lubricant to the air from the outlet end surface 27 is promoted, and the lubricant will not be easily adsorbed on and form the lump on the metal surface also from the point of view of this lubricant transpiration.

The outlet end surface 27 may be formed by a carbon layer, although the surface free energy in this case will not be as high as that of the metal layer. For example, Diamond-Like Carbon (DLC) which is generally used for a protection layer of an Air Bearing Surface (ABS) of the head slider, and having a surface free energy of 65 mN/m to 70 mN/m, may be used for the carbon layer. The surface free energy of the carbon layer forming the outlet end surface 27 is three (3) times or greater than the surface free energy of the lubricant, and is high compared to the lubricant. For this reason, the lubricant, and particularly the lubricant which wraps around from the medium opposing surface 2 to reach the outlet end surface 27, covers the carbon layer which has the high surface free energy and forms the outlet end surface 27. This lubricant covering the outlet end surface 27 spreads widely and thinly on the carbon layer, so that the lubricant will not be easily adsorbed on and form the lump on the carbon surface. In addition, the lubricant will not easily flow in reverse towards the medium opposing surface 2. As a result, the transpiration of the lubricant to the air from the outlet end surface 27 is promoted, and the lubricant will not be easily adsorbed on and form the lump on the carbon surface also from the point of view of this lubricant transpiration. Accordingly, at least the surface of the outlet end surface 27 may be made of a suitable material which has a high surface free energy compared to the surface free energy of the lubricant.

Therefore, by forming the outlet end surface 27 from a material having a surface free energy that causes the lubricant to thinly wet and spread on the outlet end surface 27, with respect to the surface free energy of the lubricant, it becomes possible to suppress the lubricant from being locally adsorbed on the outlet end surface 27. Thus, it is possible to prevent a phenomenon in which the lubricant is adsorbed on and forms a lump on the outlet end surface 27 and the lump of the adsorbed lubricant falls on the magnetic disk. As a result, it is possible to prevent a phenomenon in which the surface of the magnetic disk is contaminated by the lump of the adsorbed lubricant and the lump of the adsorbed lubricant interferes with the stable floating of the head slider or damages the head element.

[Second Embodiment]

Figure 4:
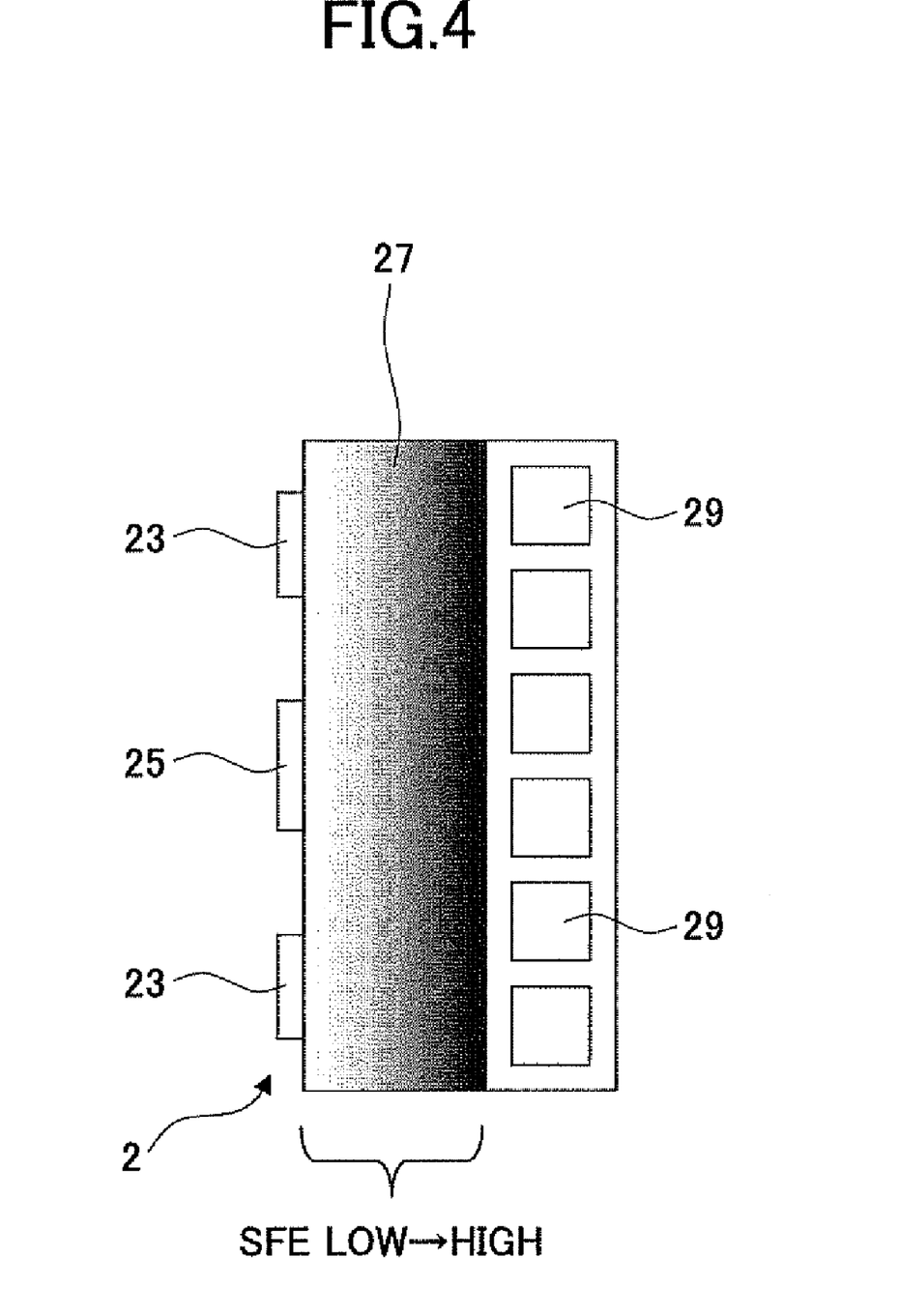
FIG. 4 is a side view of an outlet end surface of a head slider in a second embodiment of the present invention.

Next, a description will be given of a head slider in a second embodiment of the present invention, by referring to FIG. 4. FIG. 4 is a side view of an outlet end surface of the head slider in this second embodiment of the present invention. It is assumed for the sake of convenience that the basic structure of the head slider 1 illustrated in FIG. 4 is the same as that illustrated in FIGS. 1 and 2.

Unlike the first embodiment described above, the surface free energy of the outlet end surface 27 in this embodiment has a gradient from the end closer to the medium opposing surface 2 towards the end farther away from the medium opposing surface 2. In FIG. 4, the darker the tone of the region, the higher the surface free energy of the outlet end surface 27.

For example, after forming the metal layer (or carbon layer) on the outlet end surface 27, a fluoric lubricant, for example, is coated on the metal layer (or carbon layer). The fluoric lubricant is partially cured by irradiating ultraviolet ray having a wavelength of approximately 172 nm via a mask (not illustrated) having an aperture ratio that decreases from the end closer to the medium opposing surface 2 towards the end farther away from the medium opposing surface 2 (that is, from the left to right in FIG. 4). Thereafter, the uncured portions of the fluoric lubricant is removed by a rinsing in or using a solvent. Consequently, on the outlet end surface 27, more lubricant remains at the end closer to the medium opposing surface 2, and less lubricant or no lubricant remains at the end farther away from the medium opposing surface 2. Therefore, it is possible to form the outlet end surface 27 on which the surface free energy continuously changes, and the lubricant which wraps around from the medium opposing surface 2 to reach the outlet end surface 27 easily spreads from the end closer to the medium opposing surface 2 towards the end farther away from the medium opposing surface 2, while the lubricant uneasily spreads in the reverse direction towards the medium opposing surface 2.

According to this embodiment, the lubricant less easily flows in the reverse direction towards the medium opposing surface 2 even when compared to the first embodiment described above.

[Third Embodiment]

Figure 5:
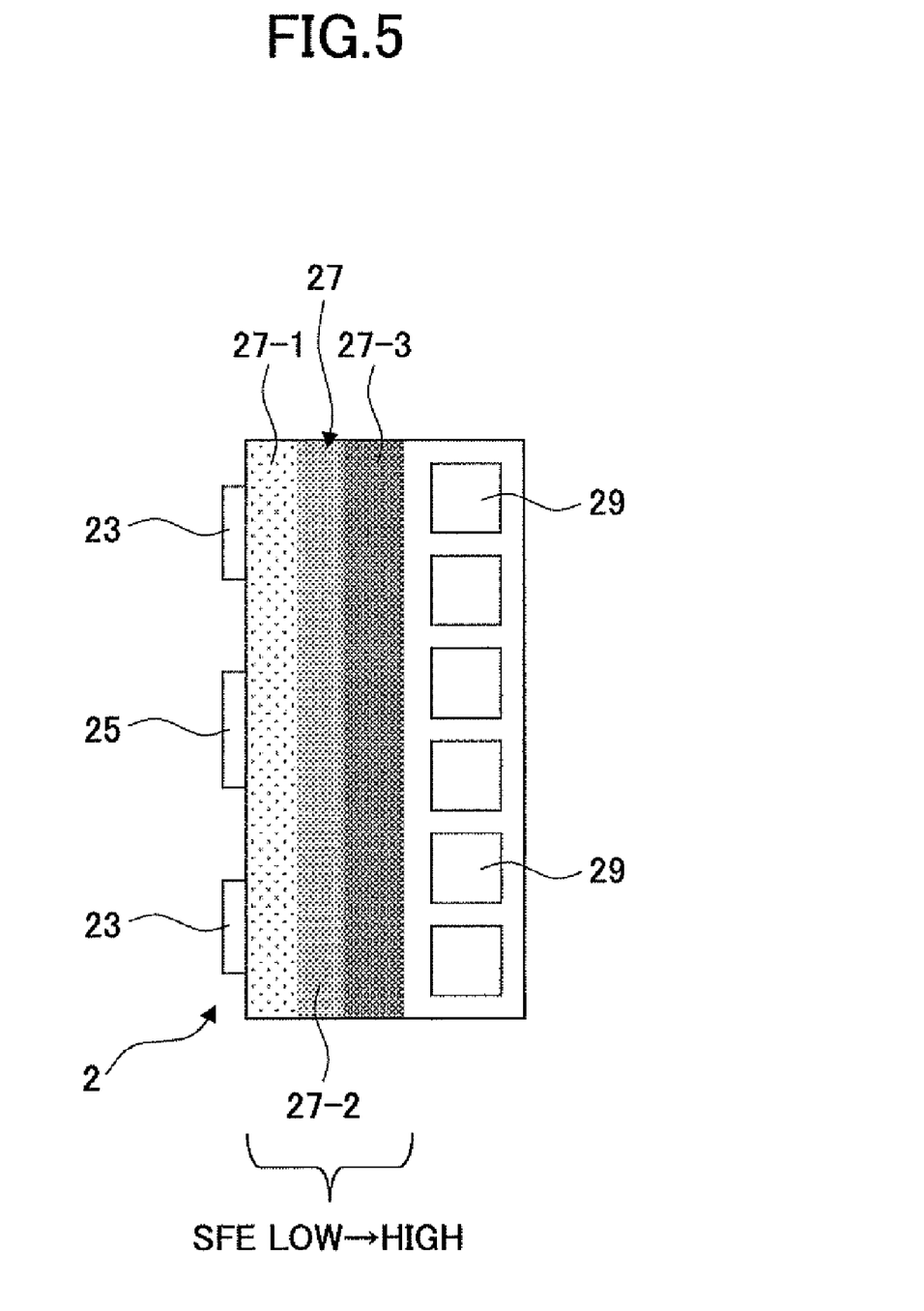
FIG. 5 is a side view of an outlet end surface of a head slider in a third embodiment of the present invention.

Next, a description will be given of a head slider in a third embodiment of the present invention, by referring to FIG. 5. FIG. 5 is a side view of an outlet end surface of the head slider in this third embodiment of the present invention. It is assumed for the sake of convenience that the basic structure of the head slider 1 illustrated in FIG. 5 is the same as that illustrated in FIGS. 1 and 2.

Unlike the first embodiment described above, the outlet end surface 27 in this embodiment has two or more regions having mutually different surface free energies in a direction from the end closer to the medium opposing surface 2 towards the end farther away from the medium opposing surface 2. In FIG. 5, the darker the tone of the region, the higher the surface free energy of the outlet end surface 27.

For example, after forming the metal layer (or carbon layer), having a relatively high surface free energy, on the outlet end surface 27, a fluoric lubricant, for example, is coated on the metal layer (or carbon layer). Then, the outlet end surface 27 is segmented into two or more regions from the end closer to the medium opposing surface 2 towards the end farther away from the medium opposing surface 2 (that is, from the left to right in FIG. 6), and the amount of ultraviolet ray irradiated on the outlet end surface 27 is reduced towards the region farther away from the medium opposing surface 2. For example, the ultraviolet ray irradiation with respect to the two or more regions of the outlet end surface 27 is performed a plurality of times using a plurality of mask features respectively having openings with a predetermined shape and placed in parallel from the end closer to the medium opposing surface 2 towards the end farther away from the medium opposing surface 2. The thickness of the lubricant that is cured is greater, that is, the thickness of the lubricant that is not cured is smaller, in the region subjected to a large amount of ultraviolet ray irradiation. On the other hand, the thickness of the lubricant that is cured is smaller, that is, the thickness of the lubricant that is not cured is greater, in the region subjected to a small amount of ultraviolet ray irradiation. Thereafter, the uncured portions of the fluoric lubricant is removed by a rinsing in or using a solvent. Consequently, on the outlet end surface 27, more lubricant remains at the end closer to the medium opposing surface 2, and less lubricant or no lubricant remains at the end farther away from the medium opposing surface 2. In the example illustrated in FIG. 6, the outlet end surface 27 is segmented into a region 27-1 having a surface free energy SFE1, a region 27-2 having a surface free energy SFE2, and a region 27-3 having a surface free energy SFE3, where SFE1<SFE2<SFE3. Therefore, it is possible to form the outlet end surface 27 on which the surface free energy changes in steps (or increments), and the lubricant which wraps around from the medium opposing surface 2 to reach the outlet end surface 27 easily spreads from the end closer to the medium opposing surface 2 towards the end farther away from the medium opposing surface 2, while the lubricant uneasily spreads in the reverse direction towards the medium opposing surface 2.

According to this embodiment, the lubricant less easily flows in the reverse direction towards the medium opposing surface 2 even when compared to the first embodiment described above.

[Fourth Embodiment]

Figure 6:
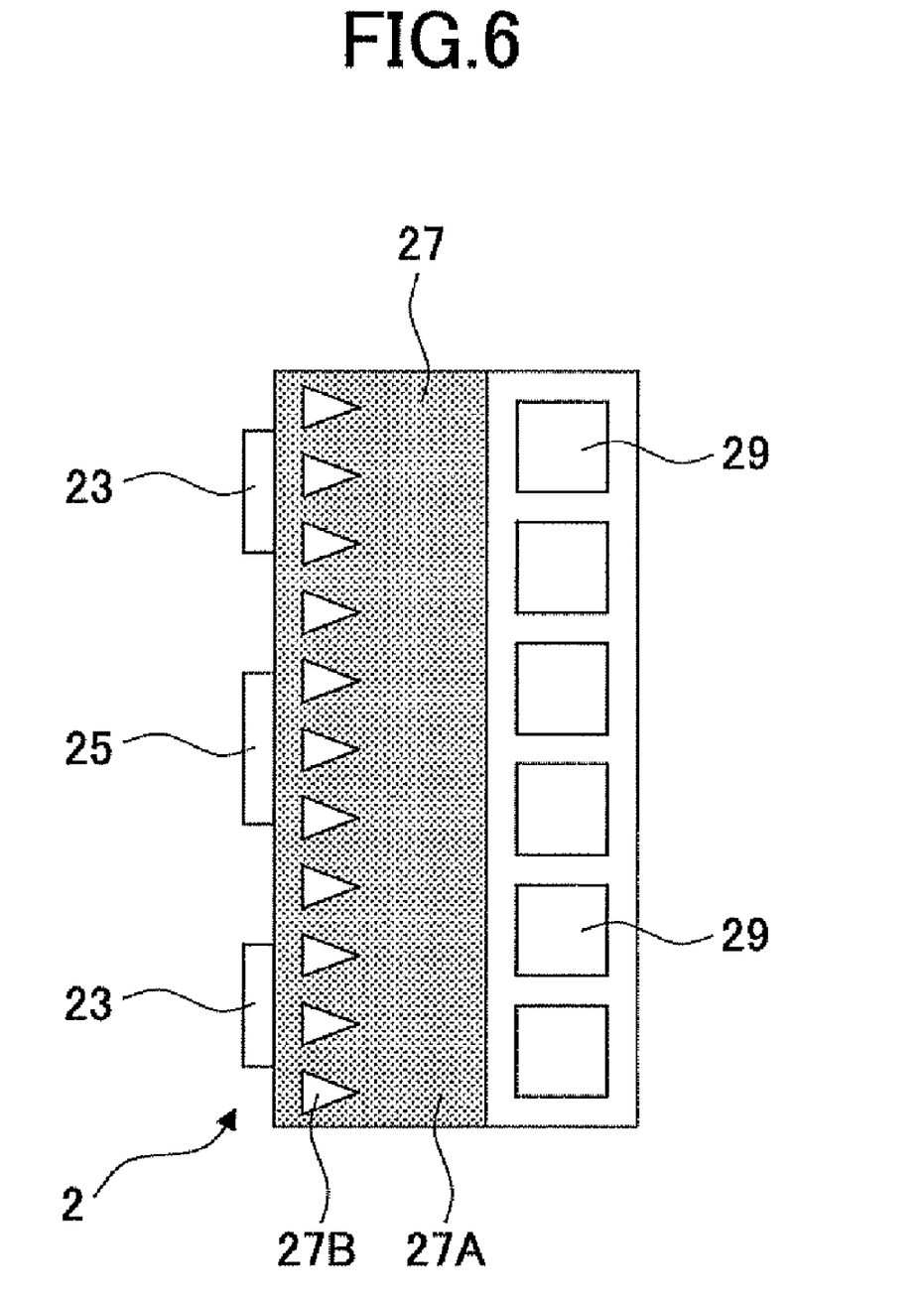
FIG. 6 is a side view of an outlet end surface of a head slider in a fourth embodiment of the present invention.

Next, a description will be given of a head slider in a fourth embodiment of the present invention, by referring to FIG. 6. FIG. 6 is a side view of an outlet end surface of the head slider in this fourth embodiment of the present invention. It is assumed for the sake of convenience that the basic structure of the head slider 1 illustrated in FIG. 6 is the same as that illustrated in FIGS. 1 and 2.

Unlike the first embodiment described above, the outlet end surface 27 in this embodiment has a region 27A having a high surface free energy, and a plurality of regions 27B having a low surface free energy. The regions 28B have a predetermined shape, and are located at predetermined positions at predetermined intervals (or pitch). The surface free energy of the region 27A is higher compared to that of the regions 27B.

Each region 28B has a shape (triangular shape in this embodiment) which is wider towards the end closer to the medium opposing surface 2 and narrower towards the end farther away from the medium opposing surface 2. Further, the regions 27B are formed at the predetermined intervals on the outlet end surface 27 along a vertical direction in FIG. 6 (a direction taken along the width of the head slider 1) in a vicinity of the medium opposing surface 2. Hence, the lubricant which wraps around from the medium opposing surface 2 to reach the outlet end surface 27 easily spreads from the end closer to the medium opposing surface 2 towards the end farther away from the medium opposing surface 2, while the lubricant uneasily spreads in the reverse direction towards the medium opposing surface 2. After forming the metal layer (or carbon layer) having a relatively high surface free energy, on the outlet end surface 27, a fluoric lubricant, for example, is coated on the metal layer (or carbon layer). Then, ultraviolet ray is irradiated on the fluoric lubricant using a mask having a plurality of openings having the shape of the regions 27B, where the openings in the mask correspond to the portions of the fluoric lubricant that are to be cured. Thereafter, the uncured portions of the fluoric lubricant in the region 27A is removed by a rinsing in or using a solvent. Therefore, it is possible to form the outlet end surface 27 on which the surface free energy changes, and the lubricant which wraps around from the medium opposing surface 2 to reach the outlet end surface 27 easily spreads from the end closer to the medium opposing surface 2 towards the end farther away from the medium opposing surface 2, while the lubricant uneasily spreads in the reverse direction towards the medium opposing surface 2.

According to this embodiment, the lubricant less easily flows in the reverse direction towards the medium opposing surface 2 even when compared to the first embodiment described above.

The method of curing the fluoric lubricant to the shape of the region 27B is of course not limited to the method described above.

[Fifth Embodiment]

Figure 7:
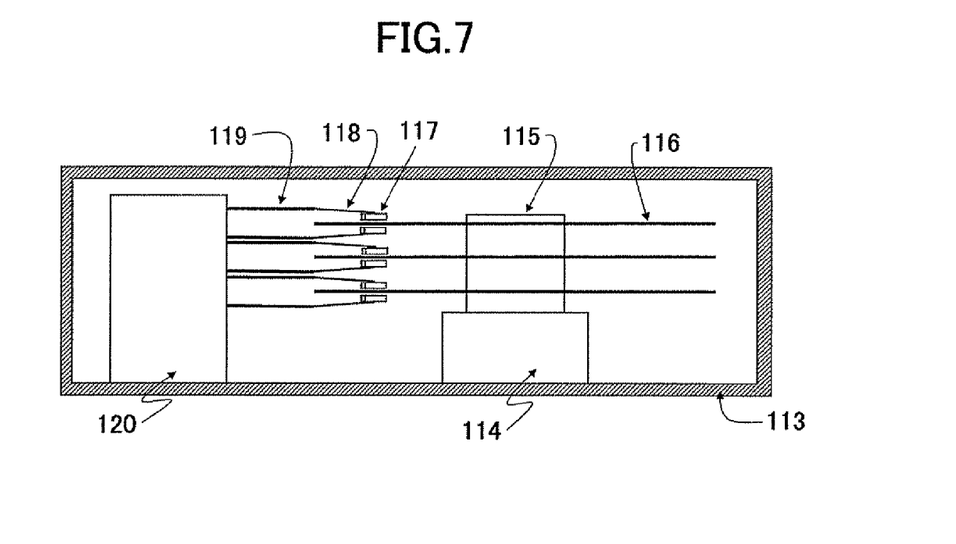
FIG. 7 is a cross sectional view of a portion of a magnetic storage apparatus in a fifth embodiment of the present invention.

Next, a description will be given of a magnetic storage apparatus in a fifth embodiment of the present invention, by referring to FIGS. 7 and 8. In this embodiment, the magnetic storage apparatus is applied to a magnetic disk drive or a Hard Disk Drive (HDD). FIG. 7 is a cross sectional view of a portion of the magnetic storage apparatus in this fifth embodiment of the present invention, and FIG. 8 is a plan view of a portion of the magnetic storage apparatus illustrated in FIG. 7 in a state without a top cover.

Figure 8:
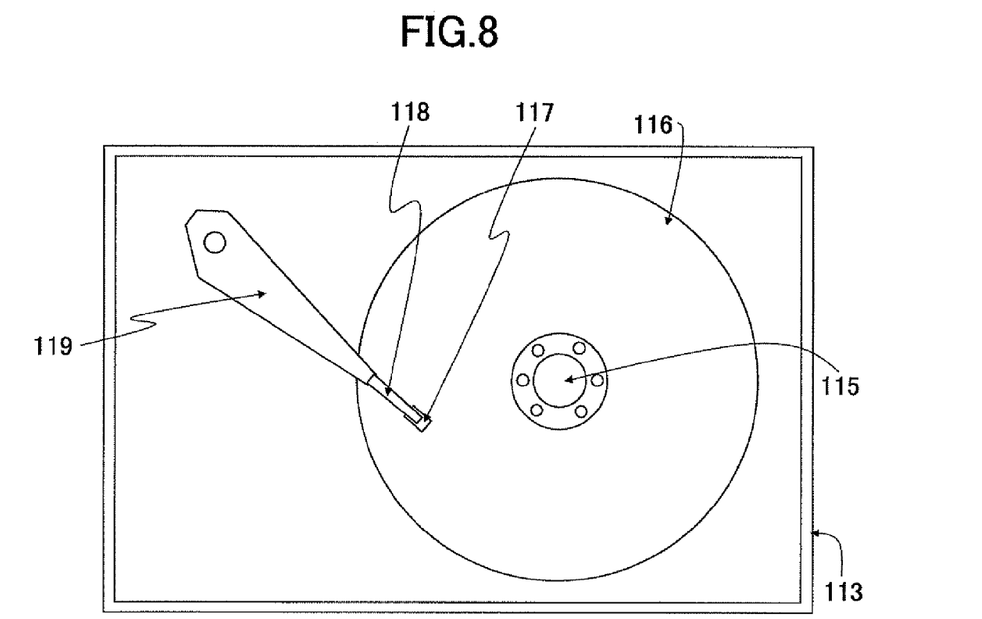
FIG. 8 is a plan view of a portion of the magnetic storage apparatus illustrated in FIG. 7 in a state without a top cover.

In FIGS. 7 and 8, a motor 114 is mounted on a base 113, and this motor 114 rotates a hub 115 to which a plurality of magnetic disks 116 are fixed. A Magneto-Resistive (MR) head that is fixed on a head slider 117 reads information from the magnetic disk 116. A Giant Magneto-Resistive (GMR) head, a Tunneling Magneto-Resistive (TuMR) head or the like may be used for the MR head. An inductive head is combined with the MR head to form the head element described above. The inductive head writes information on the magnetic disk 116.

The head slider 117 has the structure of any one of the first through fourth embodiments described above. The head slider 117 is connected to a suspension 118, and the suspension 118 pushes the head slider 117 towards a recording surface of the magnetic disk 116. A lubricant layer formed by a lubricant is provided on the recording surface of the magnetic disk 116. A medium opposing surface of the head slider 117 is patterned as described above, so that the head slider 117 floats from the recording surface of the magnetic disk 116 by a predetermined flying height at a specific rotational speed of the magnetic disk 116 and a specific rigidity of the suspension 118. The suspension 118 is fixed to a rigid arm 119 which is connected to an actuator 120. Hence, it is possible to read information from and write information on the recording surface of the magnetic disk 116.

Of course, the number of magnetic disks 116 is not limited to three as illustrated in FIG. 7. Only one or two magnetic disks 116 may be provided within the magnetic storage apparatus, and further, four or more magnetic disks 116 may be provided within the magnetic storage apparatus.

The magnetic recording medium in the embodiments described above are not limited to the magnetic disk, and the present invention is similarly applicable to other types of magnetic recording media, including magnetic cards.

In the second through fourth embodiments described above, the method of forming the portion having the low surface free energy is not limited to the methods described above. For example, after forming the metal layer or the like having the high surface free energy on the outlet end surface 27 made of alumina, the metal layer or the like may be removed by etching in accordance with the shape of the region which is to have the low surface free energy in order to expose the alumina underneath. Because the surface free energy of alumina is in a range of 30 mN/m to 40 mN/m and lower than that of the metal layer or the like that is formed on the outlet end surface 27, it is possible to obtain effects similar to those obtainable in the second through fourth embodiments described above.

In each of the embodiments described above, the lubricant contamination preventing structure is employed to make it more difficult for the lubricant to become adsorbed on and form a lump on the medium opposing surface. However, the medium opposing surface of the disclosed head slider is not limited to that having the lubricant contamination preventing structure. But in the case of the head slider having the medium opposing surface with the lubricant contamination preventing structure, the amount of lubricant wrapping around from the medium opposing surface towards the outlet end surface due to the air flow between the head slider and the rotating magnetic disk is large compared to a head slider having the medium opposing surface without the lubricant contamination preventing structure, and for this reason, the effect of suppressing the adsorption of the lubricant is greater in the case of the head slider having the medium opposing surface with the lubricant contamination preventing structure.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A head slider comprising:
    a medium opposing surface configured to oppose a recording surface of a magnetic recording medium;
    a head element provided on the medium opposing surface; and
    an outlet end surface provided on a downstream side of the head element in a direction in which the magnetic recording medium moves relative to the head element, and extending substantially in a perpendicular direction from the medium opposing surface,
    wherein the outlet end surface has a surface free energy greater than a surface free energy of the medium opposing surface, and
    the surface free energy of the outlet end surface is higher towards an end farther away from the medium opposing surface than at an end closer to the medium opposing surface.

2. The head slider as claimed in claim 1, wherein the surface free energy of the outlet end surface continuously increases or, increases in steps, from the end closer to the medium opposing surface towards the end farther away from the medium opposing surface.

3. The head slider as claimed in claim 1, wherein the outlet end surface is formed by a metal layer.

4. The head slider as claimed in claim 1, wherein the outlet end surface is formed by a carbon layer.

5. The head slider as claimed in claim 1, wherein at least a region of the outlet end surface having a surface free energy greater than a predetermined value is formed by a metal layer.

6. A head slider comprising:
    a medium opposing surface configured to oppose a recording surface of a magnetic recording medium;
    a head element provided on the medium opposing surface; and
    an outlet end surface provided on a downstream side of the head element in a direction in which the magnetic recording medium moves relative to the head element, and extending substantially in a perpendicular direction from the medium opposing surface, wherein
    the outlet end surface has a surface free energy greater than a surface free energy of the medium opposing surface,
    the outlet end surface has a first region having a first surface free energy, and a plurality of second regions each having a second surface free energy lower than the first surface free energy,
    the plurality of second regions have a predetermined shape and are located in a vicinity of the medium opposing surface at predetermined positions at predetermined intervals along a direction perpendicular to said perpendicular direction, and
    the predetermined shape is wider towards the end closer to the medium opposing surface and narrower towards the end farther away from the medium opposing surface.

7. The head slider as claimed in claim 6, wherein the outlet end surface is formed by a metal layer.

8. The head slider as claimed in claim 6, wherein the outlet end surface is formed by a carbon layer.

9. The head slider as claimed in claim 6, wherein at least a region of the outlet end surface having a surface free energy greater than a predetermined value is formed by a metal layer.

10. A magnetic storage apparatus comprising:
    a magnetic recording medium having a recording surface; and
    the magnetic head slider of claim 1.

11. The head slider as claimed in claim 10, wherein the surface free energy of the outlet end surface is approximately three times or greater than a surface free energy of a lubricant forming a lubricant layer that is provided on the surface of the magnetic recording medium.

12. A magnetic storage apparatus comprising:
    a magnetic recording medium having a recording surface; and
    the magnetic head slider of claim 6.

* * * * *

UNITED STATES PATENT AND TRADEMARK OFFICE
CERTIFICATE OF CORRECTION

| | | |
|---|---|---|
| PATENT NO. | : 8,164,859 B2 | Page 1 of 1 |
| APPLICATION NO. | : 12/484077 | |
| DATED | : April 24, 2012 | |
| INVENTOR(S) | : Imamura et al. | |

It is certified that error appears in the above-identified patent and that said Letters Patent is hereby corrected as shown below:

On the Title Page:

Under "(73) Assignee", please delete "Toshiba Storage Device Corporation"

and insert -- Kabushiki Kaisha Toshiba --

Signed and Sealed this
Eighteenth Day of September, 2012

David J. Kappos
*Director of the United States Patent and Trademark Office*